UNITED STATES PATENT OFFICE.

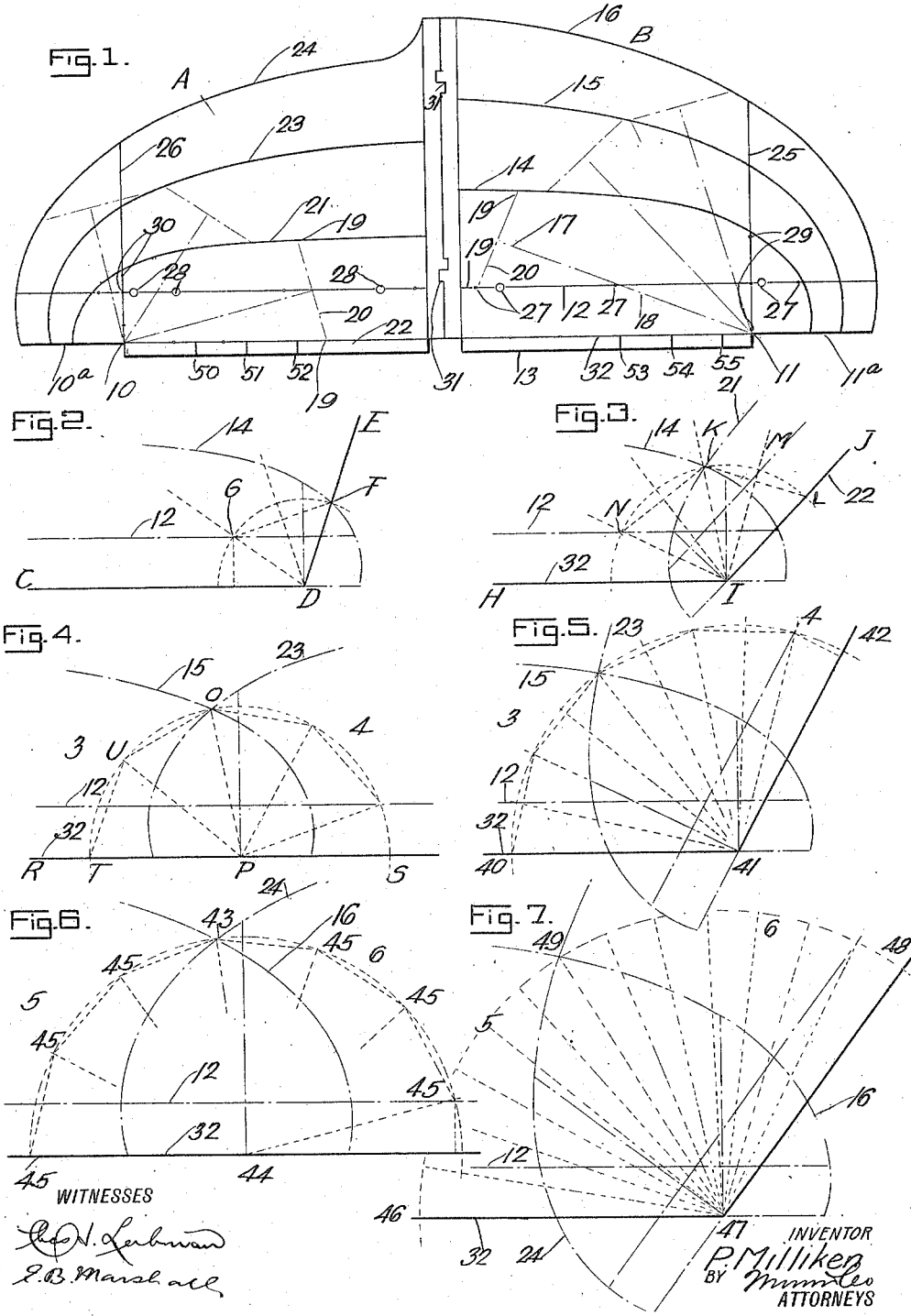

PETER MILLIKEN, OF ELSINORE, CALIFORNIA.

ANGLE AND ARC DIVIDING RULER.

1,294,935.

Specification of Letters Patent.   Patented Feb. 18, 1919.

Application filed April 12, 1918.   Serial No. 228,210.

*To all whom it may concern:*

Be it known that I, PETER MILLIKEN, a citizen of the United States, and a resident of Elsinore, in the county of Riverside and State of California, have invented a new and Improved Angle and Arc Dividing Ruler, of which the following is a full, clear, and exact description.

My invention has for its object to provide a ruler which may be used to trisect any angle, to construct equilateral triangles and hexagons, to divide angles into two, four and eight parts, to construct squares, octagons, etc., and for other purposes.

Additional objects of the invention will appear in the following specification in which the preferred form of my invention is described.

In the drawings similar reference characters refer to similar parts in all the views, in which—

Figure 1 is a plan view illustrating my ruler and

Figs. 2, 3, 4, 5, 6 and 7 are views illustrating problems which may be solved with the ruler.

By referring to the drawings it will be seen that the ruler is made in two sections A and B, each of the sections having a plurality of curves. Each ruler is also provided with a center point, the center point on the A section being indicated by the reference character 10 and the center point on the B section being indicated by the character 11. These center points are in the form of shoulders which are made by cutting out a portion of the section at 10ª and 11ª respectively.

The section B has a straight line 12 parallel with the base 13 and curves 14, 15 and 16. The curve 14 is made in the following manner: A T square is employed which is indicated in Fig. 1 of the drawings in dotted lines and by the reference character 17. This T square has one side of its blade 18 at equal distances from the ends 19 of the T square head 20. The said edge of the blade 18 is slid along the center 11. One end 19 of the T square head 20 is moved along the straight line 12, the other end 19 of the T square head 20 forming the curve 14. In a similar manner the curve 15 is formed. In this case one end 19 of the T square head 20 moves along the curve 14, the other end 19 of the T square head 20 forming the curve 15. The curve 16 is formed by moving the one end 19 of the T square head 20 along the curve 15, the other end 19 of the T square head 19 forming the curve 16 as illustrated by the dotted lines. In this case the side of the blade 18 of the T square 17 which is at equal distances from the ends 19 of the T square head 20 slides along the center 11.

In making the curves on the section A of the ruler the same principle is followed, but when the curve 21 is made the lower end 19 of the T square head 20 moves along the line 22 in the longitudinal plane of which the center 10 is disposed. The curve 23 is made by one of the ends 19 of the T square head 20 when the other end 19 moves on the curve 21 and the curve 24 is made by the upper end of the T square head 20 when the lower end moves on the curve 23. There is also a perpendicular line 25 extending upwardly from the point 11 and at right angles to the base 13 and the line 12. This perpendicular line 25 is shown in section B, a similar perpendicular line 26 being shown in section A.

There are orifices 27 in the ruler along the line 12 by which it is readily possible to dispose the ruler with its straight line 12 over a line on the drawing paper and there are also similar orifices 28 in the line 12 in section A of the ruler. There are also orifices 29 in the ruler along the line 25 and orifices 30 in the ruler along the line 26. The sections A and B of the ruler have shoulders 31 by which they may be conveniently fitted, but it will be understood that, if desired, they may be hinged together in any convenient form.

In Figs. 2, 3, 4, 5, 6, and 7, I illustrate problems which may be solved with the ruler. For instance, in Fig. 2 there is shown a convenient means for trisecting any angle such as the angle C, D, E. In solving this problem the section B of the ruler is employed, and it is so disposed that its curve 14 will be shown as illustrated in Fig. 2 of the drawings, the ruler being disposed over the drawing paper so that its line 32 will be over the side C, D of the angle. The curve 14 will intersect the side D, E of the triangle at F and with D as the center and with D, F as a radius, an arc is described. A chord F, G is then drawn which is twice the distance between the line 12 and the line C, D. A line G, D is then drawn and the angle G, D, C is one-third of the angle C, D, E. It is then easy to divide the angle G, D, F as shown.

In Fig. 3 I show the ruler employed to divide any angle into five equal parts. To solve this problem, I employ the ruler with the curves 14 and 21, they being disposed so that their centers 10 and 11 will be one over the other and with their lines 22 and 32 at the sides of the angle H, I, J, which is to be divided into five parts as stated. The curves 14 and 21 where they intersect give the point K, and the angle H, I, K is three-fifths of the angle H, I, J. From K a line is drawn to J equal to twice the distance between the lines 12 and 32. This line which is K, L is the base for a pair of right angle triangles, and when the line K, L is bisected, the line M, I is obtained. An arc may be drawn with I as the center and K, I as the radius, and the line K, N, equal to the length of the line K, L may be drawn, and when the line N, K is bisected, the angle H, I, J will be found divided into five equal parts as stated.

Fig. 4 illustrates the method in which the ruler may be employed to divide any angle into nine equal parts. In solving this problem the curves 23 and 15 are employed in the manner which has been explained with reference to the problems illustrated in Figs. 2 and 3. From the point O where the curves 15 and 23 intersect, a line O, P is drawn, the angle R, P, O being four-ninths of the angle O, P, S. With P as a center and with the radius P, O, an arc is described, chords T, V and V, O being each twice the distance between the lines 32 and 12. With these chords the remainder of the problem is readily understood.

In Fig. 5 I show the solution of a problem similar to that illustrated in Fig. 4, in which the angle 40, 41, 42 is divided into nine parts in the manner explained, it being understood that in all problems the distance between the lines 12 and 32 is the base of all right angle triangles and double this distance furnishes the base for all congruent pairs of right angle triangles.

In Fig. 6 I illustrate how a polygon of thirteen sides may be constructed with my ruler. In solving this problem the curves 24 and 16 are employed. The curves 24 and 16 intersect at 43 and the radius 43, 44 is used to describe an arc having its center at 44. It will be seen that all the chords 45, 45 are twice the distance between the lines 12 and 32, and that with these chords the remainder of the problem may be quickly solved.

In Fig. 7 I illustrate the manner in which the ruler may be used to divide any angle such as the angle 46, 47, 48 into thirteen equal parts. The curves 24 and 16 are used which intersect at 49. With the radius 49, 47 and with 47 as the center, an arc is described. Twice the distance between the lines 32, 12 furnish all the chords or bases for pairs of congruent right angles which may be readily drawn in the manner described with reference to the solution of the other problems.

The lines and curves shown on the sections A and B in Fig. 1 of the drawings are also indicated on the reverse sides of the sections.

The distances between the marks 50—51, 51—52, 53—54, 54—55 are each the distance between the lines 12 and 32. This distance is the base of all right angle triangles described by the ruler. Double this distance or 5—52 is the length of every pair of bases of right angle triangles and the length of the sides of all regular polygons described by the ruler. These marks 50, 51, 52, 53, 54, and 55 permit the use of the ruler to draw the sides of polygons and thus avoid the necessity of making use of a scale.

Having thus described my invention, I claim as new and desire to secure by Letters Patent:

1. A polysector provided with a straight-line and a point fixed relative thereto, and with a curve so shaped with respect to said line and point that straight lines drawn from points of the curve to said straight line and bisected at right angles by straight lines passing through said point are equal to one another.

2. A polysector provided with a straight-line and a point fixed relative thereto, with a curve so shaped with respect to said line and point that straight lines drawn from points of the curve to said straight line and bisected at right angles by straight lines passing through said point are equal to one another, and with a plurality of curves successively arranged with respect to said line and point and each bearing the same relation to the preceding curve as the first named curve bears to the straight line.

3. A polysector provided with a straight-line and a point fixed relative thereto with a curve so shaped with respect to said line and point that straight lines drawn from points of the curve to said straight line and bisected at right angles by straight lines passing through said point are equal to one another and with an additional curve bearing the same relation to the first curve as the first curve bears to the straight line.

PETER MILLIKEN.

Copies of this patent may be obtained for five cents each, by addressing the "Commissioner of Patents, Washington, D. C."